Figures 1, 2:
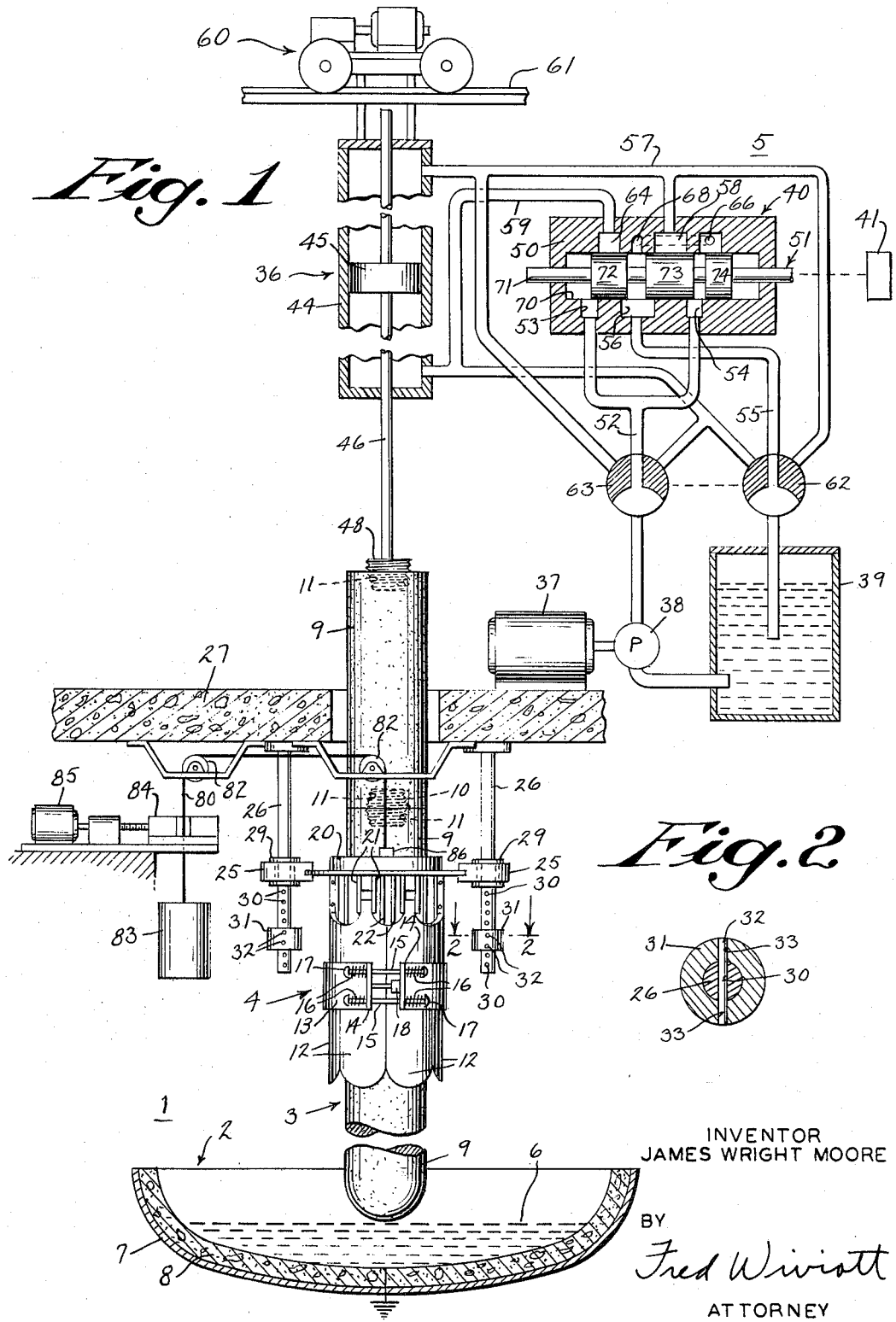

May 3, 1966 — J. W. MOORE — 3,249,673
ELECTRODE POSITIONING APPARATUS
Filed Oct. 14, 1963

INVENTOR
JAMES WRIGHT MOORE

BY
Fred Wiviott
ATTORNEY

United States Patent Office 3,249,673
Patented May 3, 1966

3,249,673
ELECTRODE POSITIONING APPARATUS
James W. Moore, Pittsburgh, Pa., assignor to McGraw-Edison Company, Milwaukee, Wis., a corporation of Delaware
Filed Oct. 14, 1963, Ser. No. 316,087
9 Claims. (Cl. 13—16)

This invention relates to electric arc furnaces, and more particularly, to means for supporting and positioning an electrode relative to the charge in an electric arc furnace.

In certain types of electric arc furnaces, the electrodes are supported and positioned relative to the furnace charge by mechanical or hydraulic systems which are driven in accordance with variations in the electrode voltage and current. These electrode positioning systems generally include an electrode clamp which serves to physically hold the electrode as well as to transmit electrical energy for the melting operation. As a result, it is desirable to position the electrode clamp as low as possible on the electrode in order to limit electrical resistance.

During normal furnace operation, the electrodes in such furnaces are consumed, worn off and broken away so that the electrode must continually be lowered toward the furnace charge in order to maintain proper arc length. It thus becomes periodically necessary to move the clamp to a higher position on the electrode so that it will not be damaged by the heat of the furnace charge or of the electric arcs. This procedure, known as slipping of the electrode, was accomplished in prior art furnaces by releasing the electrode clamp and sliding the clamp to a higher position on the electrode where it was again reclamped. Releasing of the electrode clamp in prior art apparatus required that the electrode be deenergized during the electrode slipping operation unless a second electrode clamp was supplied. This resulted in undue delay in the furnace operation.

It is an object of the invention to provide an electric arc furnace electrode positioning assembly having a single electrode clamp wherein the electrode remains energized during an electrode slipping operation.

Another object of the invention is to provide an electric arc furnace electrode slipping apparatus which automatically slips the electrode relative to the electrode clamp and without interruption of the furnace operation.

In addition to periodically slipping the electrode as the lower end thereof is consumed, it is also necessary to add sections to the upper end of the electrode so that the nominal over-all length of the electrode may be maintained. In prior art apparatus, the electrode support structure was employed to support the electrode while an auxiliary overhead crane conveyed the added electrode section to a point where it could be secured to the upper end of the electrode.

According to another object of the invention, one portion of the electrode positioning assembly is employed to support the electrode while another portion thereof conveys the added electrode section to a position wherein it may be affixed to the electrode proper.

These and other objects and advantages of the instant invention will become more apparent from a detailed description thereof taken with the accompanying drawing wherein:

FIG. 1 schematically illustrates an electrode positioning assembly according to the instant invention; and
FIG. 2 is a view taken along lines 2—2 of FIG. 1.

Referring to the drawing in greater detail, an electric arc furnace designated generally by the reference 1, is shown to include a furnace body 2, an electrode 3, an electrode clamp 4, and an electrode positioning apparatus 5.

The furnace body 2 supports a quantity of molten furnace charge or melt 6 and includes an outer metallic shell 7 and an inner lining of refractory material 8.

The electrode 3 is composed of a plurality of cylindrical sections 9 which are end-wise connected by means of a threaded plug 10 and a pair of tapped holes 11 in the upper and lower ends of each section.

The electrode clamp 4 includes a plurality of contact shoes 12 which are composed of an electrically conductive material, such as copper, and which are held in high pressure engagement with the surface of electrode 3 by a clamping band 13. The band 13 surrounds the contact shoes 12 and has a pair of radially extending clamping lugs 14 which are disposed on each side of the free ends of the band 13. A pair of tie bars 15 extend through aligned openings in each of the lugs 14, and each carries a pair of compression springs 16 between a head 17 on each of its outer ends and the outer surface of each of the lugs 14. As a result springs 16 tend to move the lugs 14 toward each other to thereby clamp the contact shoes 12 against the surface of the electrode 3 to permit the transfer of electric current therebetween and to support the weight of said electrode. A piston and cylinder assembly 18 is disposed between the lugs 14, and is operative upon being pressurized to force said lugs apart in opposition to the springs 16 and thereby release the contact shoes 12 from high pressure engagement with the electrode 3. This allows relative sliding movement between the clamp 4 and the electrode 3.

Each of the contact shoes 12 is pivotally connected at its upper end to a bus ring 20 by a pair of support arms 21. A plurality of copper tubes 22, extending between the ring 20 and the contact shoes 12, provide an electrical current path therebetween. The bus ring 20 is, in turn, connected to a source of electrical energy by flexible cables and bus bars which are not shown but which are well-known in the art. In addition, as is also well-known in the art, the copper tubes 22 may be employed to conduct cooling fluid to the contact shoes 12 which may be hollow for this purpose.

A pair of guide rings 25 are affixed to the opposite sides of the bus ring 20 for slidably engaging a pair of vertical guide rods 26, which are affixed at their upper ends to the underside of the concrete support structure 27 and which supports the electrode 3 and the positioning assembly 5 above the furnace body 2. The guide rods 26 are disposed in substantially parallel relation to the electrode 3 and serve to guide the electrode in its vertical movement toward and away from the furnace body 2.

As seen in FIGS. 1 and 2 a plurality of transverse locating apertures 30 are provided through each guide rod 26 adjacent its lower end and are disposed in vertical, equally-spaced apart relation to each other. An annular stop member 31 is affixed in surrounding relation to the lower end of each of the guide rods 26 by means of a pair of pins 32 which extend through a pair of apertures 33 formed transversely through each side of the stop member 31 and which are registerable with any pair of adjacent apertures 30 and the guide rods 26. The stop members 31 act to limit downward movement of the clamp 4. In order to insulate the guide rods 26 from the electrically energized bus ring 20, a pair of insulating bushings 29 are disposed between guide rods 26 and the guide rings 25.

Downward movement of the clamp 4 may also be arrested by a cable and clamp assembly which includes a cable 80 connected at one end to the bus ring 20 and extending upwardly therefrom over a pair of sheaves 82 to a counter weight 83 at its other end. The cable 80 also extends through a cable clamp 84 which is selectively operable by a reversible motor 85 so that upon energization of the motor in one direction the clamp 84 will be engaged to grip the cable 80 and prevent downward movement of clamp 4. Energization of motor 85 in the opposite direction will release cable 80 so that the clamp is free for downward movement by the positioning assembly 5. An insulator 86 is disposed in cable 80 to insulate the cable clamp 84 from the bus ring 20.

It can be seen that engagement between the counterweight 83 and the cable clamp 84 will also act as a stop to prevent further downward movement of the electrode clamp 4. As a result, if the length of the cable 80 is adjusted so that the counterweight 83 engages the cable clamp 84 when the electrode clamp reaches the desired lower travel limit, the stop members 31 on the guide rods 26 may be eliminated.

The electrode positioning apparatus 5 includes a hydraulic drive assembly 36 and a constant speed motor 37 for driving a constant delivery pump 38 which delivers hydraulic fluid from a reservoir 39 to the drive assembly 36 through a valve assembly 40. A control mechanism 41 positions the valve assembly 40 in accordance with the electric conditions of the arc so that the position of the electrode 3 in relation to the furnace charge 8 may be regulated.

The hydraulic drive mechanism 36 is shown to be of the reciprocatory type having a cylinder 44 and a piston 45 reciprocable therein. A piston rod 46 extends in both axial directions from the piston and through the ends of the cylinder 44 to assure that there will be no difference in area of the opposite sides of the piston 45. The lower end of the piston 45 is affixed to a threaded plug 48 which is threaded into the tap hole 11 in the upper end of the uppermost electrode section 9 so that upward movement of the piston 45 will raise the electrode 3 relative to the furnace charge 8 while downward movement of the piston 45 and the cylinder 44 will feed the electrode 3 toward the furnace body 2.

The valve mechanism 40 is schematically illustrated to include a valve body 50 having a cylindrical bore 70 and a movable valve member 51. A manifold conduit 52 connects the output of the pump 38 to inlets 53 and 54 on one side of the valve body 50 and a conduit 55 connects the reservoir 39 to another inlet 56 in the one side of the valve body 50. In addition, a first conduit 57 connects a first inlet 58 in the other side of the valve body 50 to the upper end of the cylinder 44 and a second conduit 59 connects a second inlet 64 on the other side of valve body 50 to the lower end of cylinder 44. A recess 66 in the other side of the body 50 is connected by a duct 68 to the inlet 56.

The valve member 51 includes a movable rod 71 which is connected to the control mechanism 41 and three valve elements 72, 73 and 74 which have the same diameter as the bore 70. When the valve member 51 is in a neutral position shown in the drawing, element 72 separates inlets 53 and 56 from the outlet 64, element 73 separates inlets 54 and 56 from the outlet 58 and recess 66 is connected to inlet 54 through the gap between elements 73 and 74. Upon movement of element 51 to the left, element 74 closes recess 66 to inlet 54 while outlet 58 is connected to inlet 54 and outlet 64 is connected to inlet 56. On the other hand upon movement of element 51 to the right, element 73 closes inlet 64 to recess 66 and connects outlet 58 to inlet 56 and outlet 54 to inlet 53.

Thus when the element 51 is in a neutral position the pump 38 and the reservoir 39 are connected to each other and each is disconnected from the cylinder 44. As a result, the piston 45 remains stationary. When the element 51 is moved to a first position on the left of its neutral position the upper end of the cylinder 44 is connected to the pump 38 and the lower end is connected to the reservoir so that the piston 45 moves downwardly. In addition when the element 51 is in a second position to the right of its neutral position the pump 38 is connected to the lower end of cylinder 44 and the reservoir 39 is connected to the upper end thereof so that the piston 45 moves upwardly.

As is well-known in the electric arc furnace regulating art, electrical conditions in the arc indicate whether the arc gap between the lower end of the electrode 3 and the furnace charge 8 is too long or too short. Thus, when the arc gap is too long, the resistance of the arc increases to thereby increase arc voltage and decrease arc current. Conversely, when the arc becomes too short, arc current increases and arc voltage decreases. By sensing these changes in arc current and arc voltage, the arc length can be regulated. Accordingly, the control device 41 is connected to the arc by means not shown, but which are well-known in the art for sensing arc current and arc voltage and is operable when the arc is too long to place the valve element 51 in its first position wherein the upper end of the cylinder 44 is connected to the pump 38 and the lower end of the cylinder is connected to the reservoir 39 so that fluid pressure will be applied above the piston 45 and the latter will be moved downwardly to lower the electrode. On the other hand, when the arc is too short, the control mechanism 41 will place the valve in its second position wherein the lower end of the cylinder 45 will be connected to the pump 38 while the upper end thereof will be connected to the reservoir 39 wherein the electrode 3 will be raised. When the arc length is correct, the control 41 will place the valve element 51 in its neutral position wherein the pump 38 is connected to the reservoir 39 and the electrode 3 is held in position.

The hydraulic cylinder 44 is suspended from a motor driven car 60 which is mounted on rails 61 so that the hydraulic drive mechanism 36 may be moved into and out of position above the furnace body 2.

As the electrode 3 wears away and the positioning mechanism 5 continues to feed the electrode toward the furnace body, the guide rings 25 will approach the stop members 31. When the travel limit of the electrode clamp 4 toward the furnace body 2 is reached, the guide rings 25 will engage the stop members 31, whereupon further movement of the clamp 4 toward the furnace body 2 will be prevented. Should the control mechanism 41 continue to receive electrode lower signals it will operate the valve 40 to its first position whereby the piston 45 is moved downwardly. This forces the electrode 3 through the stationary clamp 4 and against the clamping force of the springs 16. Thus, the electrode 3 will continue to be fed automatically toward the furnace charge 8 even though the clamp 4 has reached its lower travel limit. As a result the furnace operation need not be interrupted to perform an electrode slipping operation.

If it is desired to slip the electrode 3 through the clamp 4 at some higher point than the stop members 31, the cable clamp 84 is operated to grip cable 80 and arrest downward movement of the clamp 3 and then the electrode may be slipped automatically by operation of the control 41 or independently of control 41 by use of the three-way valves 62 and 63. In the latter event, valves 62 and 63 are operated counterclockwise to bypass the valve 40 and to directly connect the pump 38 to the upper end of the cylinder 44 and the reservoir 39 to the lower end of said cylinder. The electrode 3 is thereby moved toward the furnace body and relative to the stationary electrode clamp 4 until the electrode 3 reaches a new position relative to the clamp 4, whereupon the clamp 84 is released and the valves 62 and 63 are operated to their neutral positions shown in the drawing wherein they connect the pump 38 and the reservoir 39 to the valve 40 for automatic operation.

If it is desired to add a new electrode section, either the electrode 3 and the clamp 4 are lowered by operation of the valves 62 and 63 until the guide rings 25 engage the stop members 31 or the clamp 84 is engaged. In either event the electrode 3 and the holder 4 are supported against further downward movement. The plug 48 is then removed from the uppermost electrode section 9 and the valves 62 and 63 are operated clockwise to connect the lower end of the piston 44 to the pump 38 and the upper end thereof to the reservoir 39, whereupon the piston 45 is raised to a position free of the uppermost electrode section 9. The car 60 is then operated to move the hydraulic operating mechanism 36 away from the furnace 1 and to a position where the plug 48 may be inserted into another electrode section. Car 60 is then returned to a position above the electrode 3, whereupon the new section is attached to the upper end of the electrode by means of a tapered plug 10.

It can thus be seen that only a single electrode support and positioning assembly is required to perform an electrode slipping operation or to add a new electrode section.

While the control mechanism 41 and the valve 40 are only schematically illustrated, any such mechanism well-known in the art may be employed. For example, reference is made to Patent No. 2,921,107 issued January 12, 1960 and assigned to the assignee of the instant invention.

While only a single embodiment of the invention has been shown, and while the invention has been described with respect to one particular type of hydraulic drive mechanism, it is not intended to be limited thereby, but only by the scope of the appended claims.

I claim:

1. In an electric arc furnace the combination of a furnace body constructed and arranged to receive a charge of molten metal, an electrode, an electrode clamp, reversible drive means releasably connected directly to said electrode independently of said clamp and for moving said electrode toward and away from said furnace body, said electrode clamp being independent of said reversible drive means and including means for releasably forcing said clamp into high pressure electrical engagement with said electrode, and stop means for limiting the movement of said electrode clamp towards said furnace body independently of said drive means and said electrode so that said electrode may be moved by said drive means relative to said clamp without releasing said high pressure electrical engagement, said stop means also being constructed and arranged to support said electrode and said clamp independently of said drive means.

2. The device set forth in claim 1 wherein said stop means includes a first means affixed to said clamp and movable therewith and a second means fixedly mounted relative to said furnace body and engageable by said first means to arrest movement of said clamp means.

3. In an electric arc furnace, the combination of a furnace body constructed and arranged to receive a charge of molten metal, an electrode, reversible drive means releasably connected to said electrode for moving the latter toward and away from said furnace body, an electrode clamp including means for releasably forcing said clamp into high pressure electrical engagement with said electrode, guide means disposed adjacent said electrode and fixed relative thereto, said electrode clamp slideably engaging said guide means as said electrode moves relative to said furnace body, and stop means releasably mounted on said guide means in any one of a plurality of positions for limiting the movement of said electrode clamp towards said furnace body so that said electrode may be moved relative to said clamp without releasing said high pressure electrical engagement, said stop means also being constructed and arranged to support said electrode and said clamp independently of said drive means.

4. In an electric arc furnace the combination of a furnace body constructed and arranged to receive a charge of molten metal, an electrode, reversible drive means releasably connected to said electrode for moving the latter toward and away from said furnace body, an electrode clamp including means for releasably forcing said clamp into high pressure electrical engagement with said electrode, guide means disposed adjacent said electrode and fixed relative thereto, said electrode clamp slideably engaging said guide means as said electrode moves relative to said furnace body, cable means affixed at one end to said electrode clamp and extending therefrom in a direction generally away from said furnace body, cable clamping means fixedly mounted relative to said furnace body and constructed and arranged to selectively clamp said cable means to limit the movement of said electrode clamp towards said furnace body so that said electrode may be moved relative to said clamp without releasing said high pressure electrical engagement, said cable and cable clamp means also being constructed and arranged to support said electrode and said clamp independently of said drive means.

5. In an electric arc furnace, the combination of, a furnace body constructed and arranged to receive a charge of molten metal, an electrode, an electrode clamp, reversible drive means including relatively rigid means connected directly to said electrode independently of said electrode clamp for moving said electrode toward and away from said furnace body, said electrode clamp being independent of said reversible drive means and including means for releasably forcing said clamp into high pressure electrical engagement with said electrode, and means for arresting the movement of said electrode clamp toward said furnace body independently of said drive means and said electrode so that said electrode may be moved by said drive means relative to said clamp without releasing said high pressure electrical engagement.

6. In an electric arc furnace the combination of a furnace body constructed and arranged to receive a charge of molten metal, an electrode, reversible drive means releasably connected to said electrode for moving the latter toward and away from said furnace body, an electrode clamp including means for releasably forcing said clamp into high pressure electrical engagement with said electrode, stop means for limiting the movement of said electrode clamp toward said furnace body independently of said drive means and said electrode so that said electrode may be moved by said drive means relative to said clamp without releasing said high pressure electrical engagement, said stop means also being constructed and arranged to support said electrode and said clamp independently of said drive means, cable means affixed at one end to said electrode clamp and extending therefrom in a direction generally away from said furnace body, and selectively operable cable clamping means for clamping said cable to arrest the movement of said electrode clamp toward said furnace independently of said stop means.

7. In an electric arc furnace the combination of the furnace body constructed and arranged to receive a charge of molten metal, and electrode, reversible drive means releasably connected to said electrode for moving the latter toward and away from said furnace body, an electrode clamp including means for releasably forcing said clamp into high pressure electrical engagement with said electrode, stop means for limiting the movement of said electrode clamp toward said furnace body independently of said drive means and said electrode so that said electrode may be moved by said drive means relative to said clamp without releasing said high pressure electrical engagement, said stop means also being constructed and arranged to support said electrode and said clamp independently of said drive means, said stop means including a first means affixed to said clamp and movable therewith and at least one guide rod mounted parallel to the direction of electrode travel and having a stop member releasably affixed thereto in any one of a plurality of positions, said first means comprising a guide member slideably engaging said guide rod and engageable with said stop member upon movement of said clamp a predetermined distance toward said furnace body.

8. In an electric arc furnace the combination of a furnace body constructed and arranged to receive a charge of metal, an electrode, reversible drive means releasably connected to said electrode for moving the latter toward and away from said furnace body, an electrode clamp including means for releasably forcing said clamp into high pressure electrical engagement with said electrode, and stop means for limiting the movement of said electrode toward said furnace body independently of said drive means and said electrode so that said electrode may be moved by said drive means relative to said clamp without releasing said high pressure electrical engagement, said stop means also being constructed and arranged to support said electrode and said clamp independently of said drive means, said stop means comprising a cable having a first stop member affixed thereto and means fixedly mounted relative to said furnace body and having a gap formed therein for said cable to pass therethrough, said stop member being engageable with the margins of said gap upon movement of said clamp a predetermined distance toward said furnace body.

9. The device set forth in claim 8 wherein said second means also includes selectively operable cable clamping means for arresting movement of said electrode clamp upon lesser movement thereof toward said furnace body than said predetermined distance.

References Cited by the Examiner

UNITED STATES PATENTS

| | | | |
|---|---|---|---|
| 1,827,852 | 10/1931 | Marshall | 13—14 |
| 2,778,865 | 1/1957 | Kongsgaardin | 13—16 |
| 2,857,445 | 10/1958 | Mangin | 13—14 X |

RICHARD M. WOOD, *Primary Examiner.*

JOSEPH V. TRUHE, ANTHONY BARTIS, *Examiners.*